United States Patent
Gu et al.

(10) Patent No.: US 11,561,897 B2
(45) Date of Patent: Jan. 24, 2023

(54) DYNAMIC CACHE SIZE MANAGEMENT OF MULTI-TENANT CACHING SYSTEMS

(71) Applicant: VISA INTERNATIONAL SERVICE ASSOCIATION, San Francisco, CA (US)

(72) Inventors: Yu Gu, Austin, TX (US); Hongqin Song, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 59 days.

(21) Appl. No.: 17/258,883

(22) PCT Filed: Jul. 16, 2018

(86) PCT No.: PCT/US2018/042233
§ 371 (c)(1),
(2) Date: Jan. 8, 2021

(87) PCT Pub. No.: WO2020/018062
PCT Pub. Date: Jan. 23, 2020

(65) Prior Publication Data
US 2021/0326255 A1     Oct. 21, 2021

(51) Int. Cl.
*G06F 12/08*     (2016.01)
*G06F 12/0802*     (2016.01)

(52) U.S. Cl.
CPC .. *G06F 12/0802* (2013.01); *G06F 2212/1048* (2013.01)

(58) Field of Classification Search
None
See application file for complete search history.

(56) References Cited

U.S. PATENT DOCUMENTS

| 7,188,125 B1 | 3/2007 | Karr |
| 7,648,060 B2 | 1/2010 | DeBusk |

(Continued)

FOREIGN PATENT DOCUMENTS

| EP | 3109771 A1 | * 12/2016 |
| EP | 3109771 A1 | 12/2016 |

OTHER PUBLICATIONS

International Search Report and Written Opinion of International Application No. PCT/US2018/042233, dated Nov. 19, 2018, 14 pages.

*Primary Examiner* — Tracy C Chan
(74) *Attorney, Agent, or Firm* — Loeb & Loeb LLP

(57) ABSTRACT

Cache memory requirements between normal and peak operation may vary by two orders of magnitude or more. A cache memory management system for multi-tenant computing environments monitors memory requests and uses a pattern matching classifier to generate patterns which are then delivered to a neural network. The neural network is trained to predict near-future cache memory performance based on the current memory access patterns. An optimizer allocates cache memory among the tenants to ensure that each tenant has sufficient memory to meet its required service levels while avoiding the need to provision the computing environment with worst-case scenario levels of cache memory. System resources are preserved while maintaining required performance levels.

19 Claims, 7 Drawing Sheets

(56) References Cited

U.S. PATENT DOCUMENTS

| | | |
|---|---|---|
| 2012/0041914 A1* | 2/2012 | Tirunagari ............ G06F 12/121 |
| | | 706/15 |
| 2012/0284132 A1 | 11/2012 | Kim |
| 2012/0310760 A1 | 12/2012 | Phillips |
| 2013/0013499 A1 | 1/2013 | Kalgi |
| 2013/0138891 A1* | 5/2013 | Chockler ............ G06F 12/0802 |
| | | 711/E12.022 |
| 2015/0039462 A1 | 2/2015 | Shastry |
| 2016/0364419 A1* | 12/2016 | Stanton .................... G06N 3/08 |
| 2017/0017576 A1* | 1/2017 | Cammarota ........ G06F 12/0893 |

* cited by examiner

DYNAMIC CACHE SIZE MANAGEMENT OF MULTI-TENANT CACHING SYSTEMS

CROSS-REFERENCE TO RELATED APPLICATIONS

This application is a national stage entry under 35 U.S.C. § 371 of International Patent Application No. PCT/US2018/042233, filed on Jul. 16, 2018, and designating the United States, the entire contents of which are incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cache memory is used to provide fast access to data in a computer system. When the requested data is in the cache memory, time consuming requests to slower memory may be avoided. When requested data is not in the cache, a 'miss' is returned and the computer system must access the requested data from the slower memory system. Two factors affect cache hit and miss rates. One is predicting what data to keep stored in the cache as cache memory limits are reached. Multiple algorithms exist for determining which data to keep and discard. A second factor is the size of the cache. When more memory is allocated, more data can be stored in the cache and the miss rate is lowered. Too little cache memory increases the miss rate and may negatively affect system performance. However, system constraints may prevent simply provisioning an amount of cache memory that would guarantee maximum hit rates. There is a need to correctly allocate cache memory.

SUMMARY

A multi-tenant system is a system in which multiple programs share an execution environment, such as a cloud processing facility. A system cache may be shared among the multiple programs. Prior art systems simply monitor cache miss rates and increase memory to a cache that has reached a threshold of misses. A machine learning system observes memory access operations of each program and dynamically reallocates cache memory by predicting cache performance before cache miss rates increase to an unacceptable level. Rather than simply monitoring hit and miss rates, the prediction system monitors memory access requests in order to recognize access request patterns that are predictive of cache performance. Cache allocated to one tenant may be reallocated to another tenant when conditions allow. When no tenant has available cache, the total cache memory may be increased. This has the two-fold effect of ensuring that each tenant (application) has sufficient cache for operating to its service level agreement (SLA) and that the system owner does not contract for more cache memory than is required to service all tenants.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
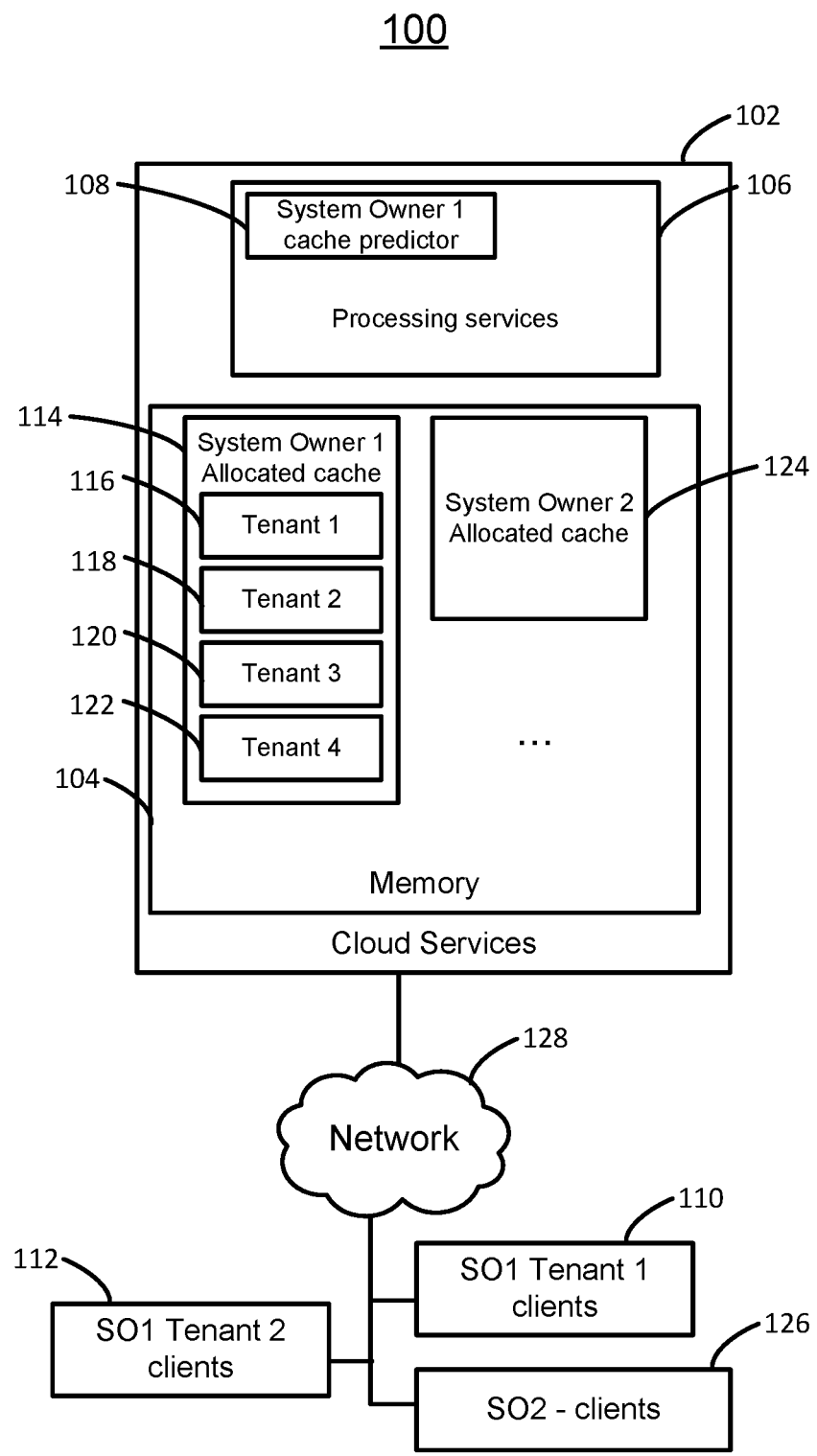
FIG. 1 is a system diagram illustrating a multi-tenant computing system configured in accordance with the current disclosure.

Cache memory may be used to improve performance in a computing environment by storing frequently or recently used data in memory that is faster and/or more accessible than a computing systems main storage facility. For example, a cache memory may be a solid state memory while the main storage may use rotating media. In conventional server systems cache memory may simply be a fixed size and data in the cache may be saved on a "least frequently used" basis. That is, data are categorized by how often each data is accessed. Those that are accessed less frequently are deleted while more frequently accessed data may be kept in the cache. Should the recently deleted data be requested, the cache memory request will fail and that data will need to be retrieved from the main storage. There are numerous technologies associated with predicting what data to keep in a cache memory. Those technologies attempt to manage system performance through keeping the most valuable data in a fixed-size cache. Cache memory size adjustments may be made manually, for example, on a daily or weekly basis.

In large systems, such as online processing systems or web server systems, the ability to keep relevant data in cache may affect system performance to the extent that required system service levels can only be achieved by ensuring a high percentage of cache hits. However, as in any system, there are constraints on cache memory. In the simplest terms, it is generally very expensive to provision large amounts of cache memory. The system architecture of a high performance system must balance the need for ample cache memory against the high cost of such memory.

Cloud computing is an example of architectures where cache memory is readily available in variable sizes. Enterprises that use a cloud computing architecture may host multiple systems in the cloud environment in a so-called multi-tenant computing environment. Of course, in implementation cloud computing environments are simply server architectures configured and managed so that third parties can host applications and services without the need to build out their own computing facilities. Among the features of cloud computing is a pay-as-you-go model where operations may increase and reduce the computing power as needed. For example, companies that support online shopping may see 10 times or even hundreds of times increases in computing resource requirements from a normal day to black Friday or cyber Monday. Similar usage peaks may occur for news providers, gaming servers, airlines, etc., for events ranging from a world crisis to weather-related airport closures. Service level agreements may be in place that require certain performance levels under all conditions further compounding the problems faced by system architects in designing and deploying high scale computing systems.

Cache memory size has a direct influence on system performance. However, the cost variation from a small test environment cache to a premium tier cache supporting tens of thousands of connections may range from several cents per hour to several dollars per hour or more. For systems requiring hundreds of thousands of connections with high guaranteed service levels, simply provisioning a cloud environment for the maximum expected load may be an economic challenge. When an enterprise hosts multiple applications in a cloud environment, the enterprise may take advantage of economies of scale by sharing cache memory among applications, or tenants. With such multi-tenant systems comes the problem of provisioning each tenant with the enough of cache memory to achieve the desired service levels without over-building the system.

FIG. 1 is an exemplary and simplified view of a multi-tenant architecture 100. A cloud service 102 may include a memory 104 and processing services 106 that are shared among system owners. A first system owner cache 114 may include cache 116, 118, 120, 122 for respective tenants. A second system owner cache 124 may not be shared among tenants but is oriented to a single tenant. Other system owners may share the cloud services but are not depicted for clarity and simplicity.

The processing services 106 may support web services, databases, etc. and may include load balancing, redundancy, backups, and other system support services that optimize performance of the servers and systems supporting the operation of the system owner systems. The actual architecture of the system may include single or multiple servers both collocated or geographically separated. As described in more detail below, a dynamic cache management system 108 may predict cache memory performance and manage dynamic allocation of memory among the tenants of one system owner, or even among tenants of various system owners depending on configuration.

A network 128 may connect the cloud service to a number of client applications 110, 112, 126. In this illustration, system owner 1 is supporting two active clients, one for tenant 1 110 and one for tenant 2 112 and system owner 2 is supporting 1 client 126. In practice, each the cache 116, 118, 120, 122 for each tenant may be supporting tens or hundreds of thousands of clients, or even more in some large scale operations such as search engines, transaction processing, gaming, etc.

Figure 2:
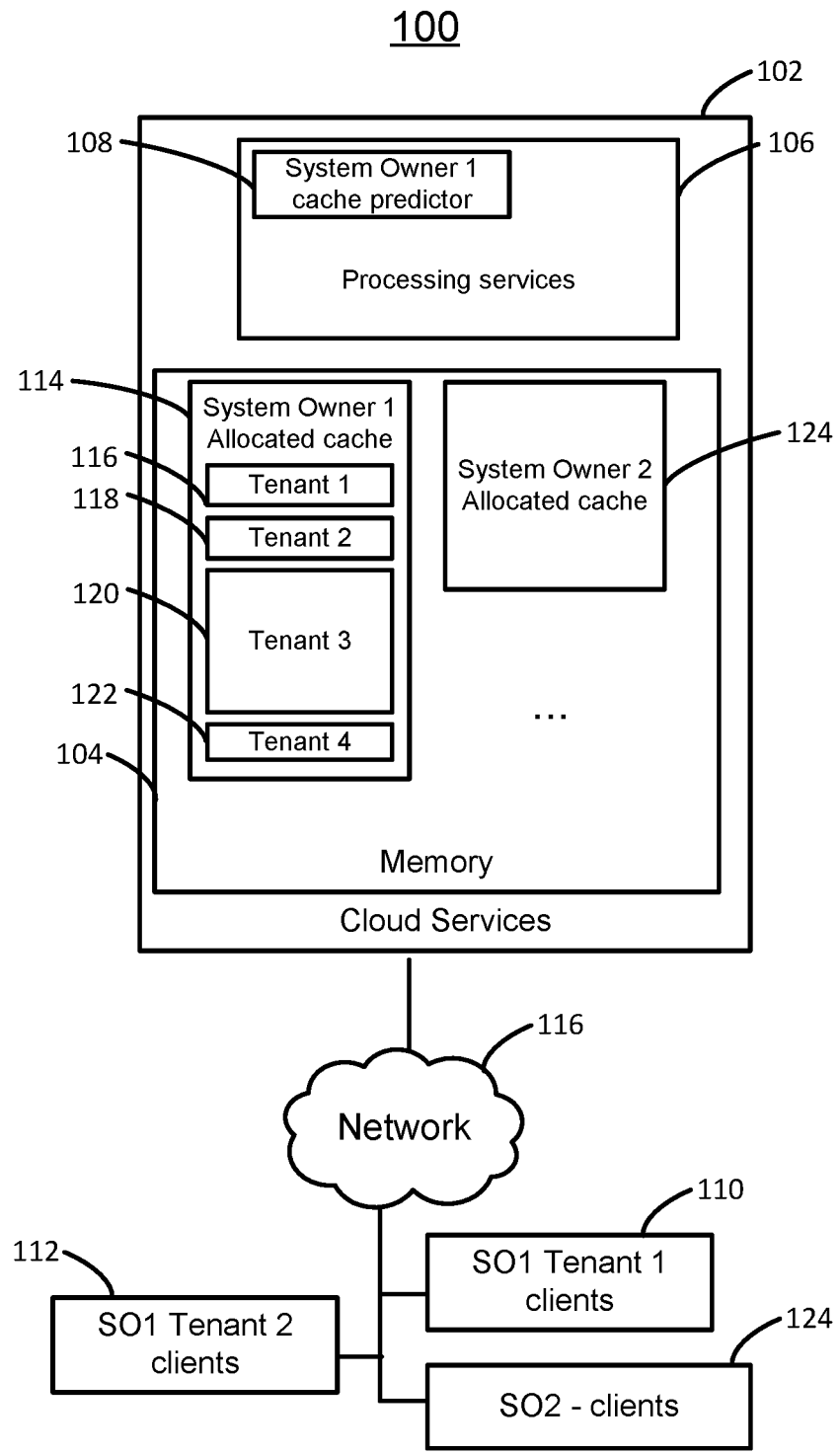
FIG. 2 is another system diagram illustrating a second configuration of the multi-tenant computing system of FIG. 1.

In the illustration of FIG. 1, the allocation of cache 116, 118, 120, 122 may be approximately the same for each tenant. This may occur, for example, at particularly low-use times or when the tenants are first brought online. FIG. 2 illustrates a situation where the cache memory for tenant 3 has been increased as indicated by the large box 120 and each of the other tenant's cache memory has been reduced as indicated by the smaller boxes 116, 118, 122. In this illustration, the overall cache memory space for system owner 1 has not changed.

Figure 3:
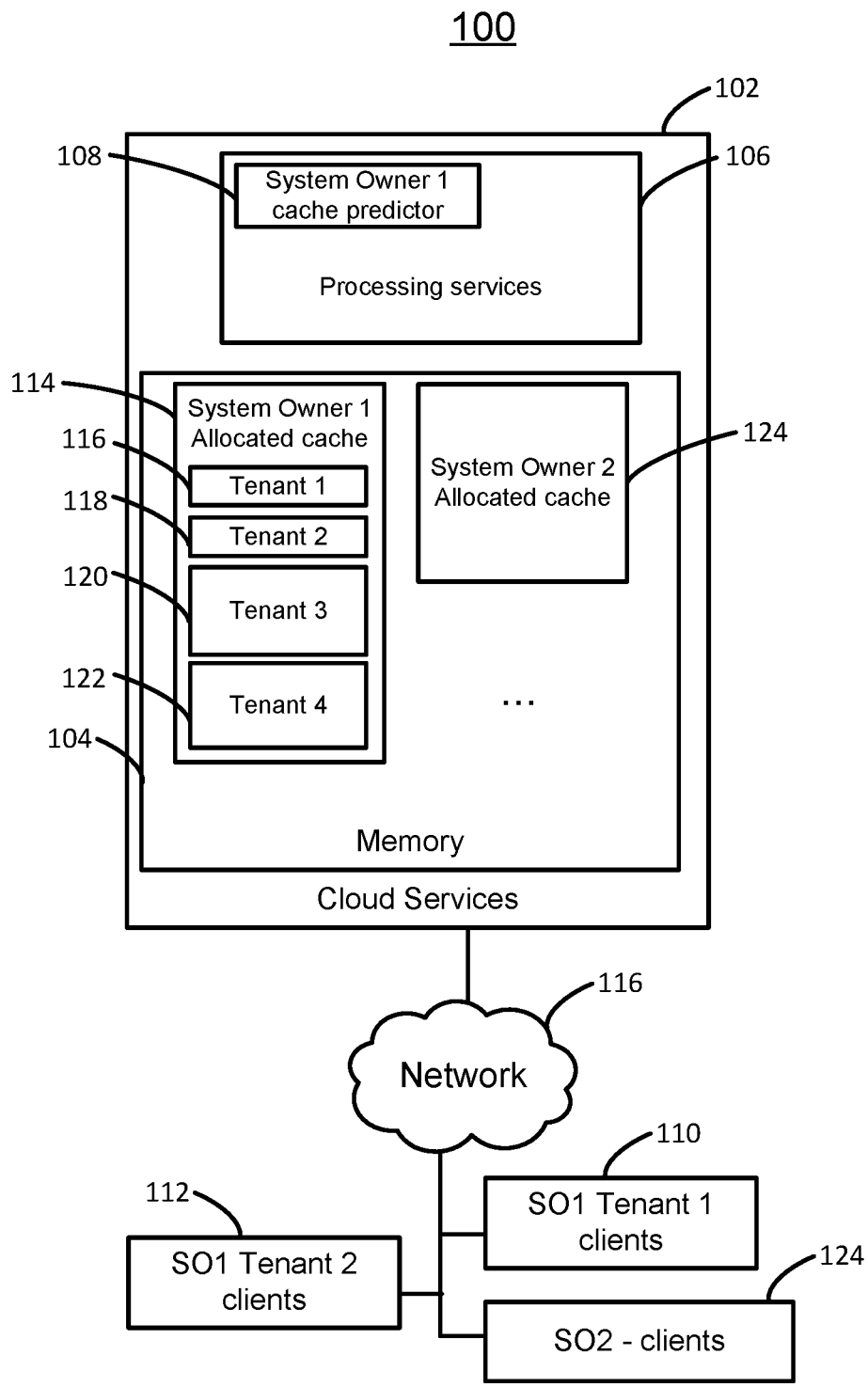
FIG. 3 is another system diagram illustrating a third configuration of the multi-tenant computing system of FIG. 1.

FIG. 3 illustrates another allocation of cache memory 114 where, compared to the allocation of FIG. 2, the cache 120 for tenant 3 has been reduced, the cache 122 for tenant 4 has been increased and the cache 116, 118 for tenants 1 and 2, respectively, have been further decreased where the size of the boxes 116, 188, 120, 122 may indicate the size of the cache.

Figure 4:
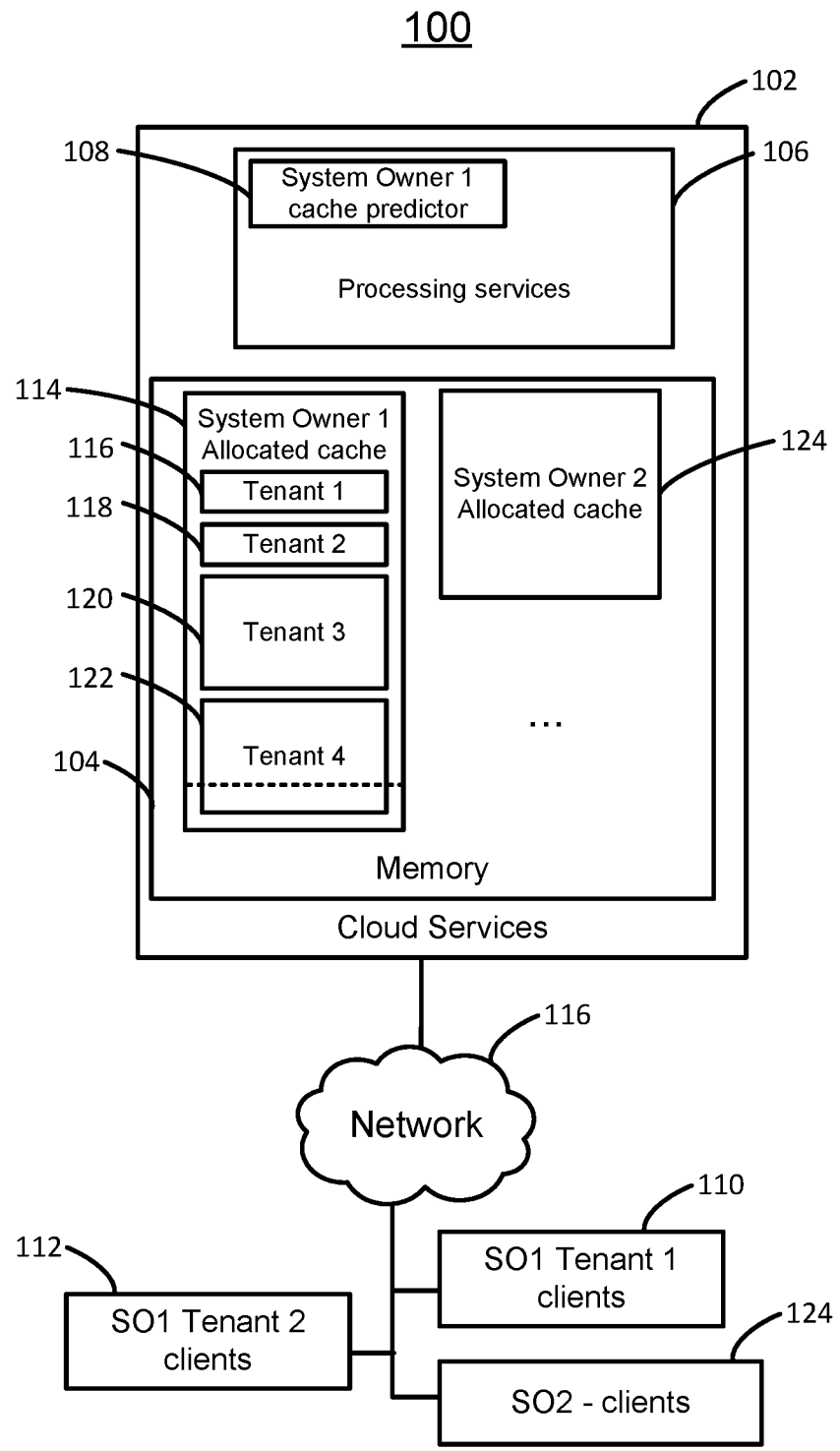
FIG. 4 is another system diagram illustrating a fourth configuration of the multi-tenant computing system of FIG. 1.

In contrast, FIG. 4 illustrates an increase in cache memory for both tenant 3 120 and tenant 4 122 such that the originally allocated cache memory 114 is not sufficient to meet the needs of each tenant which may be indicated by the memory boxes in total 116, 118, 120 and 122 moving beyond the original size of the cache 114 indicated by the dotted line. In this case, the overall size of the cache memory 114 may be increased, for example, by requesting that additional nodes or servers be added to the system owner 1 computing environment.

Figure 5:
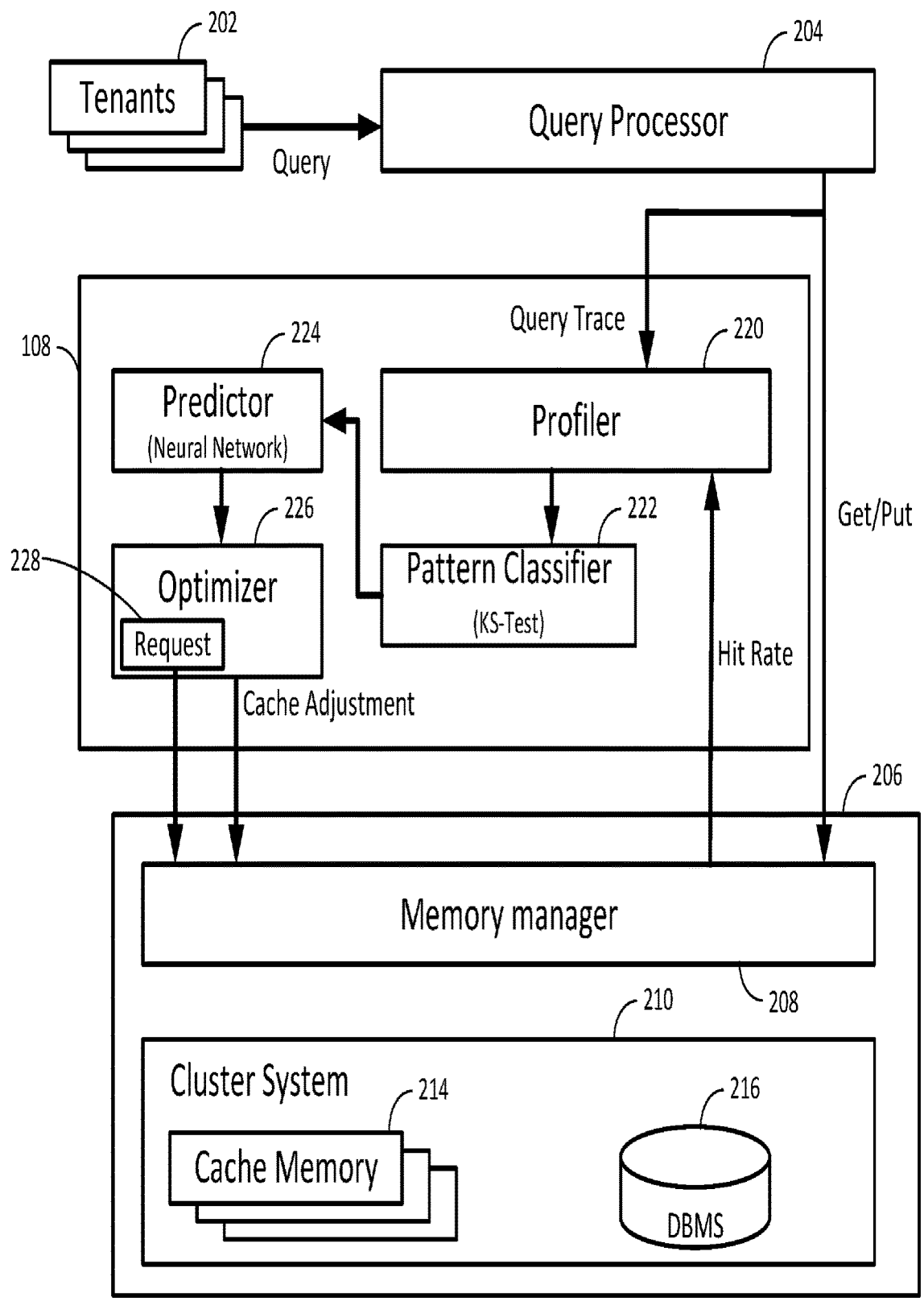
FIG. 5 is a block diagram of components associated with dynamic cache memory management in accordance with the current disclosure.

FIG. 5 illustrates an architectural view of the dynamic cache management system 108 in context of other system components. Tenants 202 make memory queries in response to operating activities resulting in, for example, database read/write operations. A query processor 204 manages the query process, accommodating load balancing, distributed servers, or other processing needs. The query may be put to a memory system 206 including a memory manager 208, cache memories 214, and one or more databases 216. In parallel, interactions between the query processor 204 and memory system 206 may be routed to the dynamic cache memory manager 108.

The dynamic cache memory manager 108 may include a profiler 220, a pattern classifier 222, a predictor 224, and an optimizer 226. The optimizer 226 may include a request module 228 that interacts with the cloud system 102 or more specifically the memory system 206 to request changes to the overall size of a system owner's cache memory 114.

The profiler 220 may capture request data for each tenant 202 being managed and may collect data over various intervals on a fixed time basis, such as a one second, or on at a variable interval based, for example, on number of samples collected. Other sampling rates or sampling patterns may be used. The pattern classifier 222 may receive the sample data from the profiler 220 and apply any of several algorithms to determine the nature of the sample. In an embodiment, a Kolmogorov-Smirnov (KS) test may categorize the sample into one of several distributions. Such distributions may include a uniform distribution, a Gaussian distribution, an exponential distribution, and a Zipf (or zeta) distribution. The distribution of samples and the change from one distribution to another may be predictive of cache performance.

Figure 6:
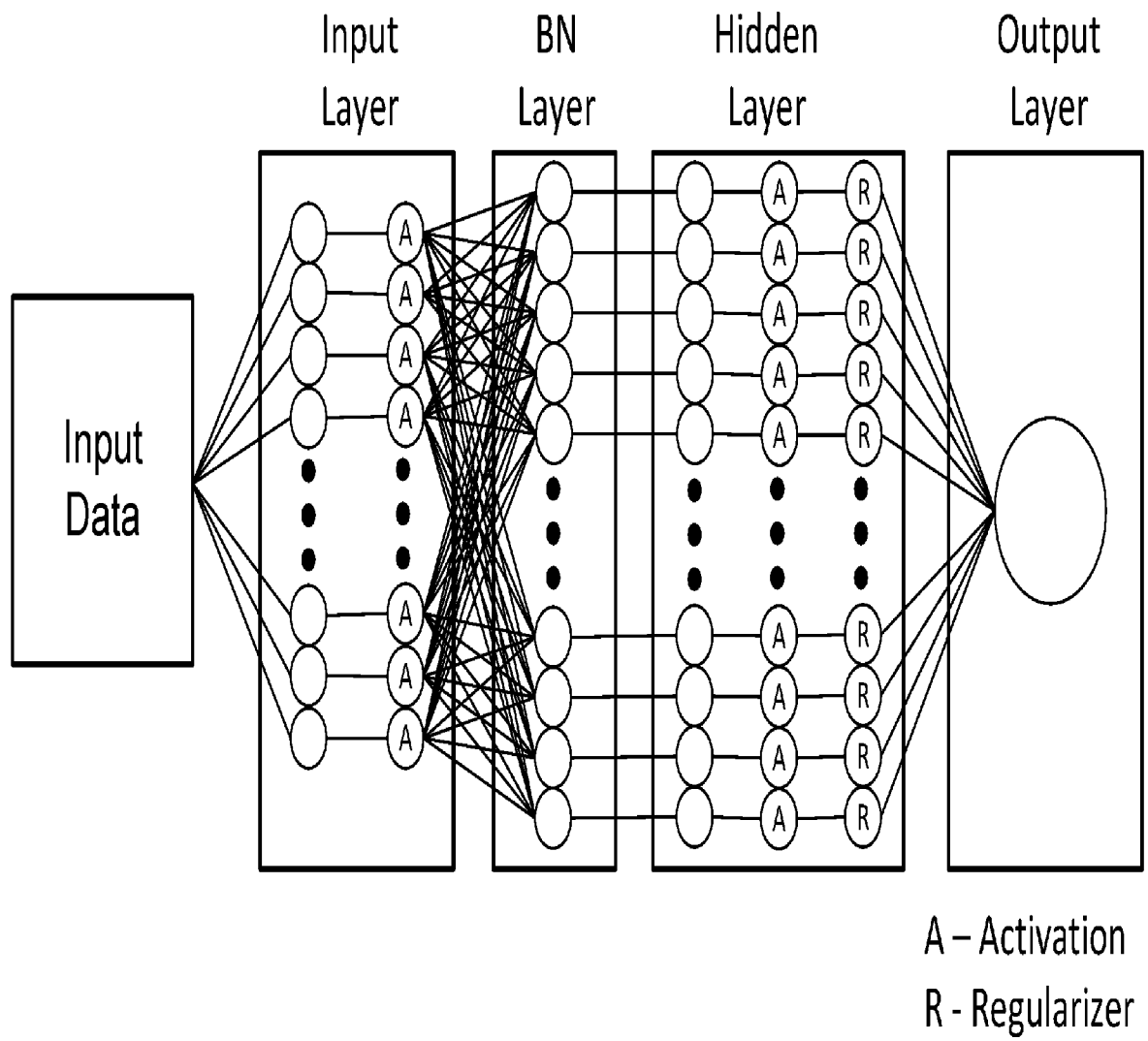
FIG. 6 is a representative block diagram of a fully connected neural network usable in the dynamic cache manager of the current disclosure.

The distribution data, and in some cases, additional information that may include sample size, sample duration, distribution statistics, etc., may be passed to the predictor 224. The predictor 224 may be a fully connected neural network (FCN), in one embodiment. Turning briefly to FIG. 6, a representative FCN 240 may be depicted. The FCN 240 has input layers and hidden layers in known fashion. During training, weights of the hidden layer nodes are adjusted so that for a given input, even a highly complex input with variations in values, an expected output is given. A characteristic of the FCN 240 is that it is very fast and produces an output virtually immediately upon an input change. This is helpful in the case of the predictive nature of the output for changing cache memory size in order to avoid reaching an undesirable service level of system performance. In contrast, a simple algorithm that monitors actual cache performance in terms of miss rates will necessarily have some undershoot or overshoot of cache performance due to the lag time between recognizing a cache performance issue and being able to correct for it.

Returning to FIG. 5, the predictor 224 may be trained using past data from the query processor so that pattern data and related statistics may be correlated to future cache memory performance. For example, past data access patterns and their corresponding distributions may be analyzed in view of the resulting service level for a given cache size. After training, the recognition of certain distributions in view of related access pattern conditions may result in accurate predictions of service level for a given cache memory size. In an embodiment, the predicted performance may be resolved within several thousand samples or less, which in some production processing systems may require less than a second.

The output of the predictor 224, for example, a predicted service level may be used by the optimizer 226 to adjust the cache memory size for a particular tenant 202, as illustrated in FIGS. 1-4. In an embodiment, each tenant may be adjusted according to the predicted service level so that when a service level is about to be reduced below a low threshold level, that tenants cache memory may be increased. Likewise, when a service level is predicted to be an above a high threshold level the cache memory may be reduced for that tenant, thereby keeping the service level in an acceptable range according to a tenant's service level agreement (SLA). In an embodiment, when unallocated cache memory is available in sufficient quantity, the increase in a tenant's cache memory space 114 may be accomplished by simply increasing the memory space for that tenant. When there is not enough cache memory available in a system owner cache space, 114, a request module 228 may be activated to request from the cloud service 102 that more cache memory be allocated to the system owner's cache memory space 114, at which time the cache memory for that tenant may be increased.

In the illustrated embodiment, each tenant is managed independently so that all size changes are made without regard to the memory needs of any other client or the current overall cache memory size. However, in one case, the system owner may contract for a certain fixed amount of total cache memory space 114. When in due course one tenant's needs are low and its cache size may be reduced, another tenant with increasing cache memory needs may occupy that space. In many cases, however, as processing needs tend to grow rather than reduce, it many cases an increase in any tenant's cache memory may require increasing the size of the overall cache memory 114 by making such a request to the cloud system memory manager 208.

Figure 7:
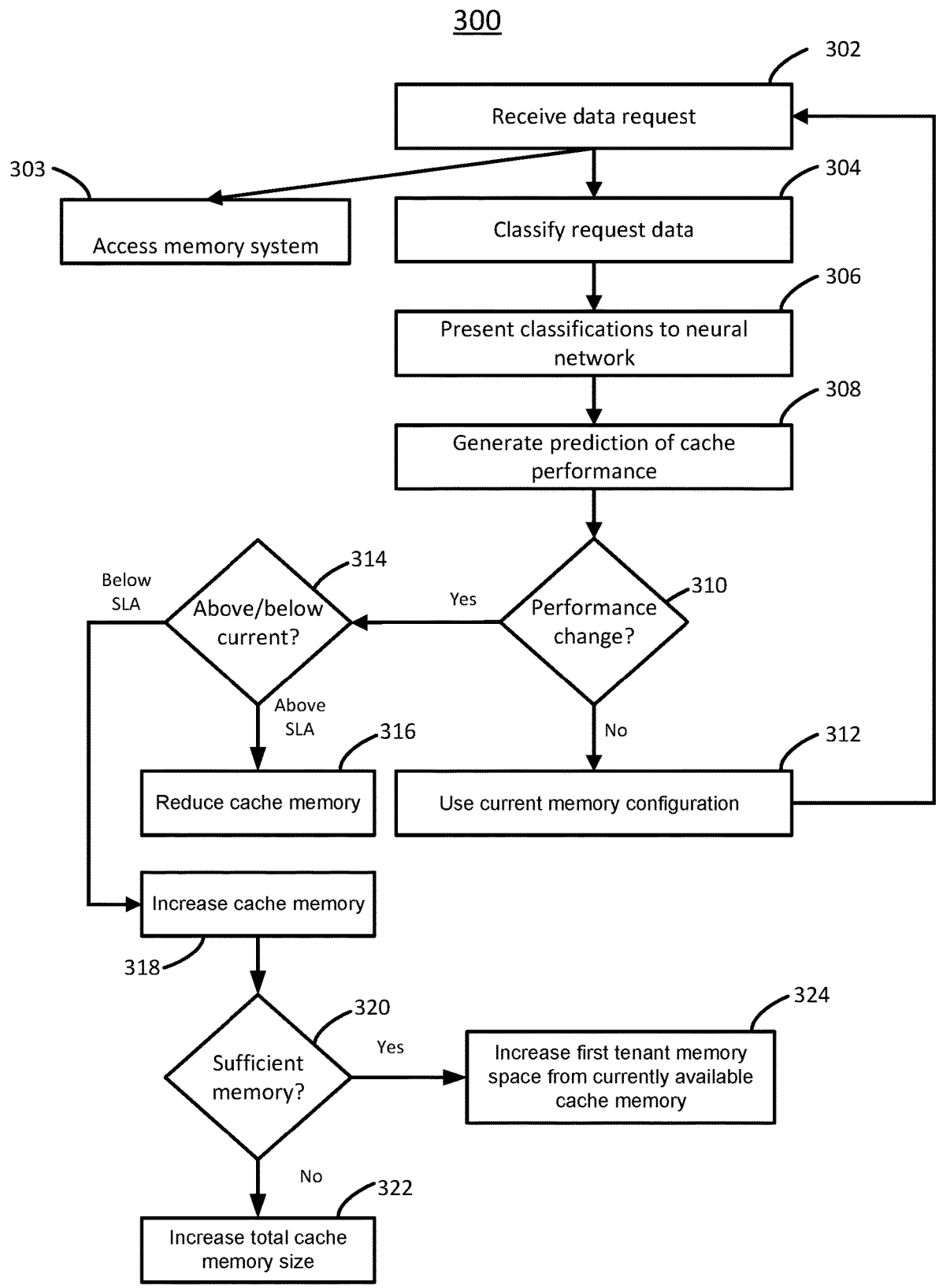
FIG. 7 is a flowchart of a method of dynamic cache memory management in accordance with the current disclosure.

FIG. 7 is an exemplary flowchart illustrating a method 300 of managing cache memory in a multi-tenant computing environment 102. The computing environment 102 may include a system owner cache memory space 114 shared among multiple tenants, as illustrated in FIG. 1 and discussed above. At block 302, a request may be received for access to a system memory 206 at both blocks 303 and 304. At block 303, in cases where the request may be fulfilled by the cache memory 214 for a tenant, a hit is noted and the data is returned to the requesting tenant. When the data is not found in cache, a miss is recorded and data is access from a slower memory such as database 216.

At block 304, the request for data may also be directed to the dynamic cache management system 108, and as discussed above, the request may be combined with other requests from the tenant and be classified using, for example, the pattern classifier 222 of FIG. 5. The distribution of requests may be provided to the predictor 224 at block 306. The predictor 224, which may include a fully connected neural network (FCN) 240 may be trained to give a prediction of cache performance levels based on the current input at block 308. For the purpose of training the FCN 240, of interest is the time is takes to effect a change in the amount of cache memory. If the cache size can be adjusted in 500 milliseconds, then the training data may be optimized for predicting cache performance 500-1000 milliseconds in the future. If the response is slower or faster, the amount of forward prediction may be adjusted. As in weather forecasting, the farther into the future a prediction must be made may reduce the accuracy of the prediction. However unlike weather forecasting, for some computing systems, the correlation of the pattern identification and the associated effect may be very strong so that accurate predictions may occur well within the response window.

At block 310, an optimizer 226 may determine if a distribution in request patterns has changed. If not, no memory configuration change is made at block 312 and execution returns to block 302. If so, execution may continue at block 314, where a determination is made if the predicted performance is above or below the current performance. If the predicted performance is above the SLA requirement, at block 316, the cache size for that tenant may be reduced.

If the predicted performance is below the SLA requirement, or another related performance level, execution of the method 300 may continue at block 318 and the optimizer may determine how much additional cache memory 116 that tenant may be required so that performance remains at above the SLA. After determining the cache size required, the optimizer 226 may determine, at block 320 whether there is sufficient free cache memory space in the currently allocated system owner memory 114 to accommodate the increased memory size. If so, at block 324, memory may be allocated to the tenant.

If not, that is there is not sufficient memory to accommodate the tenant's need, at block 322, the request module 228 may send a signal to a memory manager 208 or the like, to increase the total capacity of the system owner's cache 114 and then allocate the needed memory to the tenant's space 116. Execution may continue at block 302 from either blocks 322 or 324 and the process repeated. In an embodiment, each tenant may have a dynamic cache management system 108 while in other embodiments, the system 108 may be shared by multiple tenants.

The technical effect of the dynamic cache management system 108 is real time changes to cache memory size to achieve improved system performance by predicting future performance using a trained neural network. Optimized cache memory size benefits system operators by ensuring that performance levels are met without over-building the cache memory infrastructure. System users/tenants benefit from systems that improve guaranteed service level availability, especially during high volume periods. System users/tenants also benefit by receiving this higher service level at a minimum cost due to on-demand system reconfiguration.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system for cache memory management in a multi-tenant computing environment, the system comprising:
   a profiler module that receives, via a query processor for a first time interval, a sample of cache memory query requests from each of a plurality of tenants in parallel with corresponding memory queries to a system memory;
   a pattern classifier that receives sample data based on the sample of cache memory query requests from the profiler module, the pattern classifier applying a Kolmogorov-Smirnov (KS) test to each of the sample of cache memory query requests from the plurality of tenants into a corresponding one of several pre-determined distributions;
   a predictor module configured to determine a predicted cache memory performance for a second time interval beginning after a cache change interval for each of the plurality of tenants based on the distributions of the first sample of each tenant, the cache change interval being the amount of time for a cache memory change to take effect; and
   an optimizer that causes a system memory manager to alter cache memory size for the second time interval for at least one tenant according to the predicted cache memory performance.

2. The system of claim 1, wherein the profiler further receives cache hit data from the system memory, the cache hit data used to characterize cache performance.

3. The system of claim 1, wherein the optimizer alters the cache memory size by increasing memory to a first tenant cache memory space when a current cache memory size can accommodate the increase to the first tenant cache memory.

4. The system of claim 3, wherein the optimizer alters the cache memory size by increasing a total cache memory size of the multi-tenant computing environment and allocating the increased memory to at least one of the plurality of tenants of the multi-tenant computing environment.

5. The system of claim 1, wherein the predictor module includes a fully connected neural network that is trained using past data from the query processor.

6. The system of claim 1, wherein the optimizer receives the predicted cache performance for each of the plurality of tenants and determines when a currently available cache memory is sufficient to meet a required cache performance based on the predicted cache performance.

7. The system memory of claim 1, wherein the optimizer includes a request module that requests additional memory from a system memory manager in real time responsive to the predicted cache performance being at an unacceptable level without an increase to the currently available cache memory.

8. The system memory of claim 1, wherein the pattern classifier uses a Kolmogorov-Smirnov (KS) test to determine the classification of the query patterns.

9. The system of claim 8, wherein the classification is one of a uniform, a Gaussian, an exponential, and a Zipf distribution.

10. A method of real time allocation of cache memory in a multi-tenant computing environment, the method comprising:
    receiving, for a first time interval and from a query processor of the multi-tenant computing environment, a real time copy of memory requests made by respective tenants of the multi-tenant computing environment;
    classifying memory requests for each of the tenants into one of a plurality of predetermined distributions by applying a Kolmogorov-Smirnov (KS) test;
    predicting future cache memory performance for a second time interval beginning after a cache change interval for each tenant based on the distributions of memory requests received during the first time interval, the cache change interval being the amount of time for a cache memory change to take place; and
    adjusting an allocation of cache memory among the tenants of the multi-tenant computing environment for the second time interval according to the prediction of future cache performance.

11. The method of claim 10, wherein adjusting the allocation of cache memory comprises reducing the cache memory allocation to a first tenant and increasing the cache memory allocation to a second tenant.

12. The method of claim 10, wherein adjusting the allocation of cache memory comprises increasing an overall cache memory size for the multi-tenant computing environment and increasing the cache memory allocation for at least one of the tenants.

13. The method of claim 10, wherein predicting future cache memory performance for each tenant comprises predicting future cache memory performance using an artificial intelligence (AI) machine.

14. The method of claim 13, wherein the AI machine is a fully connected neural network.

15. The method of claim 13, further comprising training AI machine using existing cache hit data.

16. The method of claim 10, wherein the plurality of predetermined classifications comprises a uniform distribution, a Gaussian distribution, an exponential distribution, and a Zipf distribution.

17. The method of claim 10, wherein receiving, from the query processor, the real time copy of the memory request made by tenants of the multi-tenant computing environment comprises receiving the same data request made to a memory system of the multi-tenant computing environment.

18. A method of real time allocation of cache memory in a multi-tenant computing environment, the method comprising:
    receiving, for a first time interval and from a query processor of the multi-tenant computing environment, a real time copy of a memory request made by tenants of the multi-tenant computing environment;
    classifying memory requests using a Kolmogorov-Smirnov test for each of the tenants into one of a plurality of predetermined distributions;
    predicting future cache memory performance for a second time interval beginning after a cache change interval for each tenant based on the distributions of memory requests using a fully connected neural network that is trained using past data from the query processor; and
    increasing an allocation of cache memory of at least one of the tenants of the multi-tenant computing environment for the second time interval according to the prediction of future cache memory performance.

19. The method of claim 18, wherein increasing the allocation of cache memory to at least one of the tenants of the multi-tenant computing environment comprises one of reducing a cache memory allocation of at least one other tenant or increasing an overall cache memory size of the multi-tenant computing environment.

\* \* \* \* \*